United States Patent [19]
Nachbar et al.

[11] Patent Number: 5,626,445
[45] Date of Patent: May 6, 1997

[54] TUBE CUTTER TOOL AND METHOD OF USE FOR COUPON REMOVAL

[75] Inventors: Henry D. Nachbar; Marvin P. Etten, Jr., both of Ballston Lake; Paul A. Kurowski, Scotia, all of N.Y.

[73] Assignee: The United States of America as represented by the United States Department of Energy, Washington, D.C.

[21] Appl. No.: 376,150

[22] Filed: Jan. 23, 1995

[51] Int. Cl.$^6$ ............................. B23B 35/00; B23B 41/00
[52] U.S. Cl. ................ 408/1 R; 29/402.06; 29/890.031; 408/16; 408/67; 408/79; 408/209
[58] Field of Search ..................... 29/890.031, 402.06, 29/402.01, 402.11; 408/1 R, 16, 67, 79, 129, 145, 204, 207, 209, 703; 409/143

[56] References Cited

U.S. PATENT DOCUMENTS

| | | | |
|---|---|---|---|
| 1,266,520 | 5/1918 | Nilson | 408/79 |
| 2,181,512 | 11/1939 | Kirby | 408/79 |
| 3,954,136 | 5/1976 | Gugel . | |
| 4,380,991 | 4/1983 | Richter et al. | 408/204 |
| 4,440,531 | 4/1984 | Astle . | |
| 4,702,878 | 10/1987 | Klug et al. . | |
| 4,703,264 | 10/1987 | Edwards . | |
| 4,919,194 | 4/1990 | Gery et al. . | |
| 4,936,013 | 6/1990 | Sahawneh . | |
| 5,088,553 | 2/1992 | Ralston et al. | 409/143 |

FOREIGN PATENT DOCUMENTS

| | | | |
|---|---|---|---|
| 642908 | 6/1962 | Canada | 408/79 |
| 51217 | 2/1989 | Japan | 408/204 |
| 58409 | 3/1989 | Japan | 408/204 |
| 58407 | 3/1989 | Japan | 409/143 |
| 190208 | 7/1990 | Japan | 408/204 |

*Primary Examiner*—Daniel W. Howell
*Attorney, Agent, or Firm*—Virginia B. Caress; William R. Moser; Paul A. Gottlieb

[57] ABSTRACT

A tube cutter tool is insertable into a tube for cutting a coupon from a damaged site on the exterior of the tube. Prior to using the tool, the damaged site is first located from the interior of the tube using a multi-coil pancake eddy current test probe. The damaged site is then marked. A fiber optic probe is used to monitor the subsequent cutting procedure which is performed using a hole saw mounted on the tube cutter tool. Prior to completion of the cutting procedure, a drill in the center of the hole saw is drilled into the coupon to hold it in place.

15 Claims, 2 Drawing Sheets

TUBE CUTTER TOOL AND METHOD OF USE FOR COUPON REMOVAL

The U.S. Government has rights in this invention pursuant to Contract Number DE-AC12-76-SN00052 awarded by the U.S. Department of Energy.

FIELD OF THE INVENTION

The present invention is related to a tube cutter tool and a method of using the tool for coupon removal and, more particularly, to a tool which is insertable into a tube for use in removing a portion of the tube at a damaged site located on the exterior of the tube.

BACKGROUND OF THE INVENTION

It is well known in the art that metal tubes used in heat transfer devices are susceptible to wear, erosion and other degradations which may create weaknesses or other potential failure points. One typical prior art method to determine the cause of damage to a tube involves making a circumferential cut on the tube wall and removing the entire section of the tube having a damaged portion thereon. This method is useful where a straight length portion of the tube has been affected. However, access to more constricted areas and removal of relatively large sections of tubing is limited where the cutting procedure is performed from the interior of the tube. In particular, the aforementioned prior art method cannot be utilized where the damaged area is located in a bent section of the tube, such as a U-bend where stress cracking or corrosion is most likely to occur. In these latter cases it is desirable to remove only the damaged area by cutting away a small "coupon", plugging the tube and leaving the remaining section of tube in place. For purposes of this disclosure, the term "coupon" refers to a small specimen of a tube, which is typically circular, but may have any shape.

In addition, when a damaged area on a tube is identified before complete failure of the tube wall, it may be desirable to determine the cause thereof in an attempt to reduce the risk of further damage to the remaining tubes in the tube bundle and thereby extend the life of the tube bundle. Determination of the cause of damage requires laboratory examination of the affected area, which necessitates removal of at least a portion of the damaged area on the tube.

SUMMARY OF THE INVENTION

It is a purpose of the present invention to overcome the disadvantages of the prior art and to provide a tool and a method of use therefor for removing only a small coupon from a damaged area on a tube.

In accordance with a preferred embodiment of the invention the tube cutter tool includes means for cutting a coupon encompassing at least a portion of the damaged site and means for holding the coupon in place during cutting. The tool also includes means for confirming the position of the cutting means with respect to the damaged site. Preferably, the confirmation means comprises a fiber optic viewing lens positioned near the cutter assembly, the cutting means comprises a hole saw and the holding means comprises a drill located in the center of the hole saw.

In accordance with a preferred method of removing a coupon from a tube, a damaged site on a tube is first located and a cutting tool is then inserted into the tube. Thereafter, the tube is cut to obtain a coupon. Preferably, the damaged site is located by using a multi-coil pancake eddy current test probe. The test probe may also be used to mark the interior of the tube at the damaged site, so that the location of the damaged site may be verified by visual monitoring means such as fiber optics.

It is, therefore, an object of the invention to provide a tool and a method for analyzing damaged tubes which allows for removal of only a small coupon rather than an entire tube section.

It is another object of the invention to provide a tool and a method of use therefor in which both location and removal of a damaged section are performed from the interior of the tube.

Other objects, features and advantages of the present invention will become apparent from the detailed description to follow.

BRIEF DESCRIPTION OF THE DRAWINGS

There follows a detailed description of the preferred embodiments of the present invention which are to be taken together with the accompanying drawings, wherein.

DESCRIPTION OF THE PREFERRED EMBODIMENT

Referring now to the figures, like elements are represented by like numerals throughout the several views.

Figure 1A:
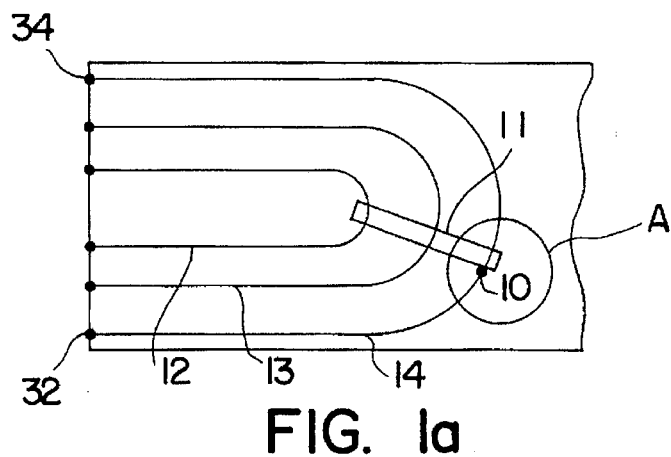
FIG. 1a shows a U-tube having a damaged site.
Figure 1B:
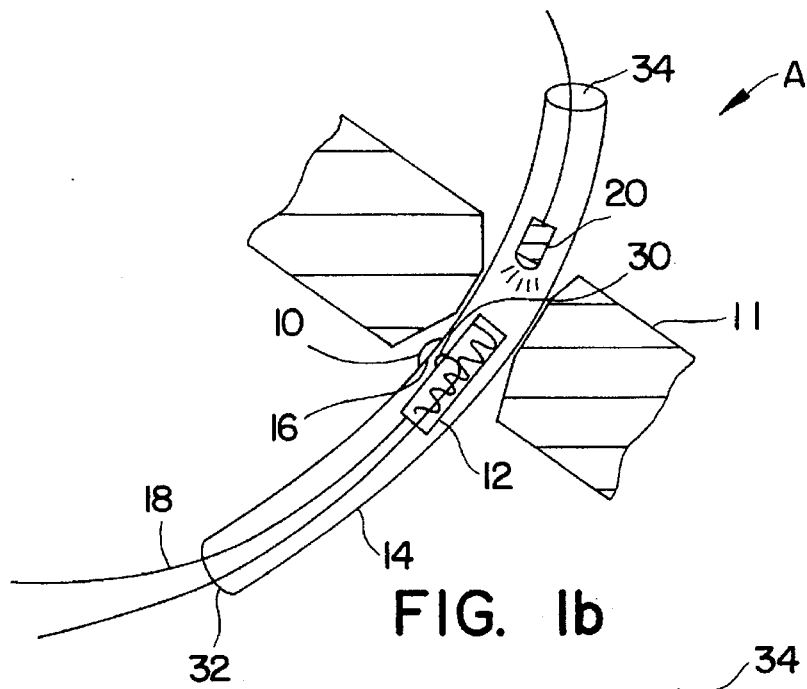
FIG. 1b shows an exploded view of section A in FIG. 1a during identification and marking of the damaged site.
Figure 1C:
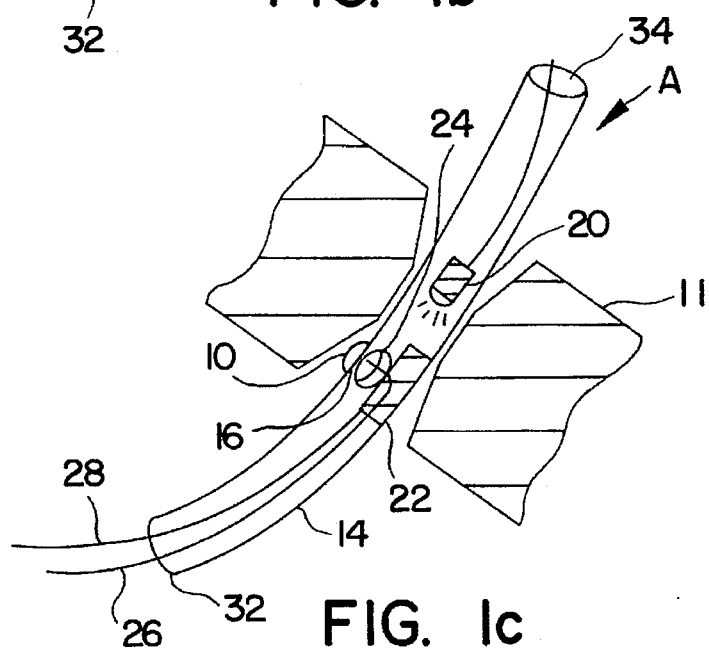
FIG. 1c shows an exploded view of section A in FIG. 1a during removal of a coupon from the damaged site.

FIGS. 1a, 1b, and 1c show the steps in accordance with the method of the invention for locating and removing a coupon encompassing a damaged site on a tube. In general, the damaged site is first located using a probe. Once located, the damaged site is marked. A second probe is then used to verify the location of the mark and remains at that location during a subsequent coupon removal operation.

FIG. 1a shows three U-tubes 12, 13 and 14 on a heat exchange apparatus. Tube 14 has a damaged site 10 located on its exterior. In most cases, damage to a tube originates on the exterior of the tube. However, depending on the type of apparatus in which the tube is utilized, the damaged site may be more easily located from the interior rather than from the exterior of the tube. In the tubing configuration shown in FIG. 1a, for example, the damaged site 10 is located near an antivibration bar 11. Consequently, access to the damaged site 10 from the exterior of the tube 14 is restricted. In such cases, where access to the damaged site is best accomplished from the interior of the tube 14, it is necessary to utilize a marker probe 12, such as that shown in FIG. 1b, which includes means for sensing the damaged site 10 through the tube wall. The marker probe 12 should further include marking means 30 for providing an identifying mark on the tube wall. One marker probe having the requisite identification and marking properties is a multi-coil pancake eddy current test ("E.T.") probe having a scribe-type marking means contained between the coils.

FIG. 1b shows an exploded view of section A in FIG. 1 during location and marking the damaged site 10 from the interior of tube 14. The damaged site 10 is first identified using the marker probe 12 inserted into one end 32 of the tube 14. Upon locating the damaged site 10, the marker probe 12 marks the interior tube wall 16 at the location of the damaged site 10. The marker probe 12 should be mounted on a flexible line or cable 18 to allow the probe to negotiate bends in the tube 14. Depending on the marking means 30 utilized for marking the tube wall 16, drying of the tube 16 wall may be necessary before applying the mark. Drying may be accomplished by blowing air into the tube 14. While the marker probe 12 is held in place at a first end 32 of the tube, a video probe 20, fiberscope or other suitable visual monitoring means is inserted in the opposite end 34 of the tube 14. The video probe 20 is used to verify the location of the mark in the tube wall 16. Once the mark is located, the video probe 20 is held in place inside the tube 14 and the marker probe 12 is removed. The video probe 20 is left in the tube 14 to monitor the insertion of the coupon cutter 22 as well as the actual cutting procedure. Alternatively, in a preferred embodiment, a visual monitoring means described below is located directly on the coupon cutter.

FIG. 1c shows an exploded view of section A in FIG. 1 during cutting and removing of the damaged site. First, a coupon cutter 22 having a cutting means (not shown) is inserted in the first end 32 of the tube 14 from which the marker probe 12 was removed. Any suitable metal cutter apparatus may be used for the coupon cutter 22. However, the cutter apparatus should be attached to a flexible line or cable 28 to negotiate bends in the tube 14. Examples of such cutter apparatuses include a single or multiple cutting tool driven by a right angle gear head powered through a flexible shaft, an electro-discharge machining ("EDM") tool powered by flexible cables, and a laser cutting device having fiber optic light pipes which power a focusing assembly positioned near the mark in the tube wall 16. The cutting means of the coupon cutter 22 should be sized slightly larger than the desired coupon diameter size. Thus, in most cases, the cutter means will be sized to remove the entire damaged site in the tube, although the desired coupon size may be smaller than the damaged site if the coupon is being cut for the purpose of laboratory analysis. In general, a coupon having a diameter of 0.125 to 0.187 inches is of a suitable size for laboratory examination. In addition, the coupon cutter 22 must include means for fixing the cutting means in an exact orientation within the tube 14, such as fore and aft cam springs described below in connection with FIG. 2, while coupon removal is taking place.

After insertion into the tube 14, the coupon cutter 22 is positioned over the damaged site 10 by viewing the inside of the tube 14 through the video probe 20 and placing the cutting means in line with the mark on the tube wall 16. Cutting of the coupon 24 is then commenced. The entire cutting procedure may be monitored using the video probe 20. If necessary, lubrication and cooling fluids may be supplied to the work area using supply tubes.

Figure 2:
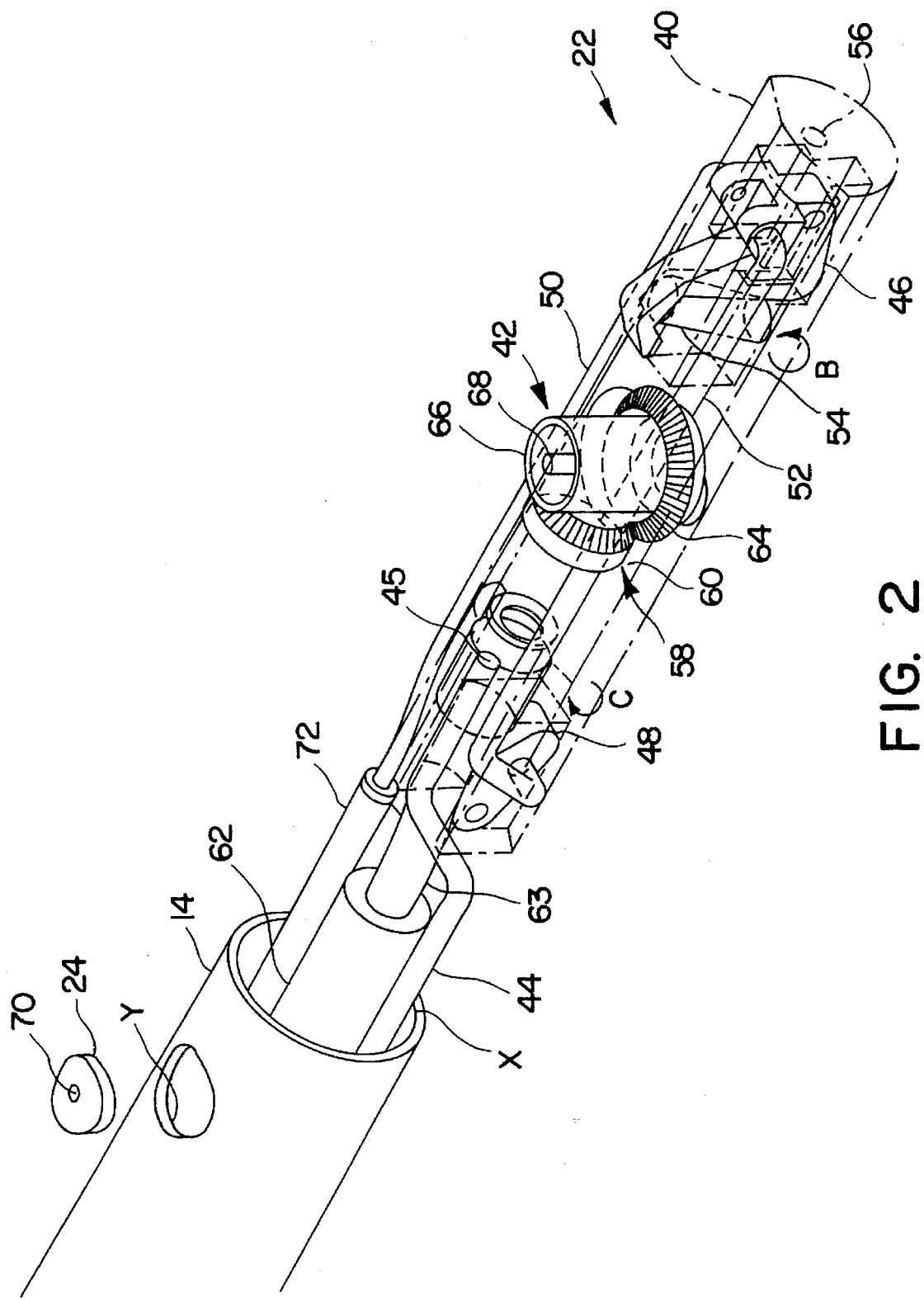
FIG. 2 shows a preferred embodiment of a coupon cutter used in the method of the invention.

Once the coupon 16 is machined free of the tube 14, a vacuum is applied via suction line 26 to suck the coupon 24 to the inside of the tube 14. Alternatively, and more preferably, a center hole drill described below in connection with FIG. 2 is used to drill into the coupon 24 and hold it on the drill bit, thereby preventing the coupon 24 from falling to the exterior of the tube 14 which could cause damage to the heat exchange apparatus. The coupon 16, video probe 20 and coupon cutter 22 are then removed from the tube 14.

FIG. 2 shows a preferred embodiment of the coupon cutter 22 of the invention. The coupon cutter 22 includes a central body mounting frame 40 (shown in dashed lines) to which all internal and external parts and components of the coupon cutter 22 are attached. The central body mounting frame 40 is both movable in the direction of and rotatable around the axial centerline of the tube 14 in order to position a cutter assembly 42 at any position along the inside circumference of the tube 14. Visual confirmation of the exact position of the cutter assembly 42 is made possible through the provision of a fiber optic line 44 having a viewing lens 45 mounted near the cutter assembly 42. Consequently, a separate video probe corresponding to probe 20 of Figure b and c is not required. A nitrogen gas purge line (not shown) may also be located on the central body mounting frame 40 for cleaning the fiber optic viewing lens 45.

The central body mounting frame 40 includes two double acting cams, a forward cam 46 and a rear cam 48. The cams 46 and 48 are connected by a connecting rod 52 and move in unison and in an opposite rotational direction of equal magnitude when a pull cable 50 attached to the forward cam 46 is pulled. Rotation of the cams 46, 48 in the direction of arrows "B" and "C", i.e., counterclockwise and clockwise, respectively, in the embodiment shown in FIG. 2, causes equal and opposite contact of the cams 46, 48 with internal surface "X" of the tube 14 and forces the cutter assembly 42 toward the damaged site 10 on internal surface "Y" as indicated by the mark on the tube wall 16. An index device may be used to ensure proper positioning of the cutter assembly 42. The pull cable 50 is housed in a flexible casing 72.

The cutter assembly 42 includes a right angle bevel gear assembly 58 which includes a driver gear 60 and a driven gear 64. A flexible casing 62 surrounds the drive shaft 63 which provides power to the driver gear 60. The driver gear 60, in turn, drives the driven gear 64 which is attached to the hole saw 66, thereby rotating the hole saw 66. The hole saw 66 has a diamond cutting edge into which diamonds are sintered for a smooth, even cutting of the coupon. A drill 68, located in the center of the hole saw 66, is also equipped with a diamond tip by sintering. The drill 68 is slightly longer than and, therefore, rises above the elevation of the hole saw 66. Consequently, the drill 68 drills into the center 70 of the coupon 24 and holds the coupon 24 as the hole saw 66 completes the cutting operation. The drill 68 then pulls the coupon 24 into the tube 14 when the cutter assembly 42 is retracted by the operation of cams 46 and 48. The coupon cutter 22 may further include a torque indicator (not shown) for indicating when the cutting operation is completed. After removal of the coupon 24, release of the pull cable 50 in a direction opposite arrows "B" and "C", i.e., clockwise and counterclockwise, respectively, allows the compression spring 54 to expand causing the forward cam 46, and thus rear cam 48, to push on internal surface "Y" of the tube and retract the cutter assembly 42. Minor adjustments to the action of cams 46 and 48, i.e., to their degree of rotation, which may be needed to accommodate different tube diameters, may be made using stop screw 56.

Although the invention has been described with respect to preferred embodiments thereof, it will be apparent to those skilled in the art that variations and modifications can be effected in these embodiments without departing from the spirit and scope of the invention as set forth in the claims.

We claim:

1. A method of removing a portion of a tube comprising the steps of:

locating a damaged site on a tube from the interior of said tube;

inserting a cutting tool into said tube;

confirming the location of said damaged site and said cutting tool using fiber optic means;

cutting said tube with said cutting tool; and monitoring said cutting using fiber optic means, to obtain a coupon from said tube at said damaged site.

2. The method according to claim 1 wherein said damaged site is located by using a multi-coil pancake eddy current test probe.

3. The method according to claim 1 further comprising the step of placing a mark on the interior of the tube at the location of the damaged site.

4. The method according to claim 3 wherein said mark is placed on the tube using a multi-coil pancake eddy current test probe having a marker contained between coils thereof.

5. The method according to claim 1 further comprising the step of gripping said coupon before completion of said step of cutting, so that said coupon is held in place during and after said step of cutting.

6. The method according to claim 5 wherein said step of gripping comprises drilling into said coupon and retaining the drill in said coupon.

7. The method according to claim 5 wherein said step of gripping comprises applying suction to said coupon.

8. A tube cutter tool comprising:

cutting means, insertable inside the tube, for cutting a coupon encompassing at least a portion of a damaged site;

identifying means comprising a fiber optic viewing lens positioned near the cutting means for monitoring the cutting and confirming the location of the cutting means with respect to the damaged site from the interior of the tube; and holding means for holding said coupon in place during and after cutting.

9. The tube cutter tool according to claim 8 wherein the cutting means comprises a hole saw.

10. The tube cutter tool according to claim 9 wherein said hole saw includes a diamond cutting edge.

11. The tube cutter tool according to claim 9 wherein said holding means comprises a drill located in the center of the hole saw.

12. The tube cutter tool according to claim 11 wherein the hole saw includes a cutting edge defining a plane and wherein said drill extends beyond the plane of the hole saw so as to enable the drill to drill into the damaged site.

13. The tube cutter tool according to claim 9 wherein said cutting means further comprises a right angle bevel gear assembly including a driver gear and a driven gear in communication with the driver gear, said driven gear being attached to the hole saw and mounted at a substantially right angle to the driver gear and said driver gear being attached to and powered by a drive shaft for rotating the hole saw.

14. The tube cutter tool according to claim 8 further comprising means for forcing said cutting means against the damaged site.

15. The tube cutter tool according to claim 14 wherein said forcing means comprises two double acting cams which push against sides of the tube to force said cutting means against or away from the damaged site, and connecting rod means for connecting said double acting cams together such that said cams move in unison and in opposite rotational directions when said connecting rod means is actuated.

* * * * *